United States Patent [19]

Stournas et al.

[11] 4,124,512
[45] Nov. 7, 1978

[54] OIL RECOVERY BY WATERFLOODING EMPLOYING SUCCINIMIDO ARYL SULFONATE SURFACTANTS

[75] Inventors: Stamoulis Stournas, Flemington; El-Ahmadi Ibrahim Heiba, Princeton, both of N.J.

[73] Assignee: Mobil Oil Corporation, New York, N.Y.

[21] Appl. No.: 719,135

[22] Filed: Aug. 31, 1976

Related U.S. Application Data

[63] Continuation-in-part of Ser. No. 488,885, Jul. 15, 1974, abandoned.

[51] Int. Cl.$^2$ ............................................. E21B 43/22
[52] U.S. Cl. ................................. 252/8.55 D; 166/274; 166/275; 260/326.5 SF; 260/501.21; 260/507 R
[58] Field of Search ............... 252/8.55 D; 166/273, 166/274, 275; 260/501.21, 507 R, 326.5 SF

[56] References Cited

U.S. PATENT DOCUMENTS

| | | | |
|---|---|---|---|
| 3,469,630 | 9/1969 | Hurd et al. | 252/8.55 X |
| 3,508,612 | 4/1970 | Reisberg et al. | 252/8.55 X |
| 3,732,290 | 5/1973 | Danzik | 260/507 R |
| 3,858,656 | 1/1975 | Flournoy et al. | 166/274 |
| 3,890,239 | 6/1975 | Dycus et al. | 252/8.55 |

FOREIGN PATENT DOCUMENTS 1,194,286  6/1970  United Kingdom.

*Primary Examiner*—Herbert B. Guynn
*Attorney, Agent, or Firm*—C. A. Huggett; William D. Jackson

[57] ABSTRACT

A method for the recovery of oil from an oil-containing subterranean formation by waterflooding employing as an injection medium an aqueous solution of an anionic surfactant comprising a hydrocarbyl substituted succinimido aryl sulfonate and/or its succinamic acid derivative. Such surfactants retain their detergency and do not precipitate in aqueous systems containing high concentrations of brine, e.g., over 20,000 ppm $Ca^{++}$, over 10,000 ppm $Mg^{++}$ and over 50,000 ppm $Na^+$. These surfactants are effective in mobilizing tertiary oil under highly saline environments and demonstrate low adsorptive losses. When used as cosurfactants, these materials significantly improve the brine tolerance of more sensitive surfactants, such as petroleum sulfonates. In accordance with one form of the invention, the solution of a minor amount of such surfactants with petroleum sulfonates increased the tolerance of the petroleum sulfonates four-fold with respect to sodium ions and seventy-fold with respect to calcium and magnesium ions. According to a preferred form of the invention, the surfactants comprise the condensation products of a $C_{10}$–$C_{50}$ hydrocarbyl substituted succinic anhydride with either an aminobenzenedisulfonic acid or an amino naphthalene di- or tri-sulfonic acid.

17 Claims, No Drawings

OIL RECOVERY BY WATERFLOODING EMPLOYING SUCCINIMIDO ARYL SULFONATE SURFACTANTS

CROSS REFERENCE TO RELATED APPLICATION

This application is a continuation-in-part of our copending application Ser. No. 488,885, filed July 15, 1974, now abandoned.

BACKGROUND OF THE INVENTION

This invention relates to the recovery of oil from subterranean reservoirs and, more particularly, is concerned with improved waterflooding operations involving the use of hydrocarbyl substituted succinimido aryl sulfonates and/or their corresponding succinamic acid derivatives which are stable to high concentrations of divalent cations and which function as cosurfactants capable of significantly improving the brine stability of other more sensitive surfactants, such as petroleum sulfonates.

In the recovery of oil from oil-bearing reservoirs, it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In the supplemental techniques, which are commonly referred to as secondary recovery operations although in fact they may be primary or tertiary in sequence of employment, fluid is introduced into the reservoir in order to displace the oil therein to a suitable production system through which the oil may be drawn to the surface of the earth. The displacing medium may be a gas, an aqueous liquid such as fresh water or brine, an oil-miscible liquid such as butane, or a water and oil-miscible liquid such as alcohol. The most widely used supplemental recovery technique is waterflooding which involves the injection of water into the reservoir.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the floodwater in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil, and improving the sweep efficiency of the waterflood.

Processes which involve the injection of aqueous surfactant solutions in order to reduce the oil-water interfacial tension are commonly referred to as low tension waterflooding. Thus far, most low tension waterflooding applications have employed anionic surfactants. For example, a paper by W. R. Foster entitled "A Low Tension Waterflooding Process", Journal of Petroleum Technology, Vol. 25, February 1973, pp. 205-210, describes a promising technique involving the injection of an aqueous solution of petroleum sulfonates within designed equivalent weight ranges under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

A serious limitation encountered in waterflooding with anionic surfactants such as petroleum sulfonates is the tendency of the surfactants to precipitate from solution in the presence of even moderate concentrations of divalent metal ions such as calcium and magnesium ions. Typically, divalent metal ion concentrations of about 50-100 ppm and above cause precipitation of the petroleum sulfonates. Thus, as taught for example in the Foster paper, the surfactant slug may be preceded by a protective slug which functions to displace reservoir waters containing unacceptable amounts of divalent ions ahead of the subsequently injected surfactant slug. Another limitation imposed upon use of anionic surface-active agents resides in the fact that desired low interfacial tensions can seldom be achieved, even in the absence of divalent metal ions, at salinities significantly in excess of 2 or 3 weight percent. Thus, the protective slug as well as the surfactant slug normally will be of a relatively low salinity.

A number of recent patents are directed to low tension waterflooding and surfactant systems which tolerate relatively high salinities and/or divalent metal ion concentrations. For example, U.S. Pat. No. 3,811,504 — Fluornoy et al is directed to a low tension waterflooding process for use in environments exhibiting a polyvalent ion concentration of about 1500 to about 12,000 parts per million and which employs a three-component surfactant system containing two anionic surfactants and one nonionic surfactant. One of the anionic surfactants is an alkyl or alkylaryl sulfonate and the other anionic surfactant is an alkyl polyethoxy sulfate containing from 1 to 10 ethoxy groups and from 7 to 20 carbon atoms in the alkyl group. The nonionic surfactant may be a polyethoxylated alkyl phenol or a polyethoxylated aliphatic alcohol.

U.S. Pat. No. 3,508,612 — Reisberg et al is directed to a low tension waterflooding process employing a calcium compatible anionic-anionic surfactant system which can be employed in saline solutions containing from 0.01 to 5 molar NaCl and from about 0 to 0.1 molar $CaCl_2$. One of the anionic surfactants employed in the Reisberg et al process is an organic sulfonate such as petroleum sulfonate having an average molecular weight within the range of 430-470 and the other surfactant is a sulfated ethoxylated alcohol. A preferred sulfated alcohol is one containing a $C_{12}$-$C_{15}$ alkyl group and three ethylene oxide groups.

Another technique involving the use of calcium-compatible surfactant systems in low tension waterflooding is disclosed in U.S. Pat. No. 3,827,497 — Dycus et al. In that patent, the patentees disclose a process in which a three-component or two-component surfactant may be employed. The three-component system comprises an organic sulfonate surfactant such as petroleum sulfonate, a polyalkylene glycol alkyl ether, and a salt of a sulfonated or sulfated oxyalkylated alcohol. The two-component system comprises an organic sulfonate surfactant and a salt of a sulfonated oxyalkylated alcohol. These surfactant systems may be employed in a brine solution which will usually contain about 0.5-8% sodium chloride and will often contain 50–5,000 ppm polyvalent metal ions such as calcium and/or magnesium ions.

Hydrocarbyl substituted succinimido phenyl monosulfonates which are described as having detergent properties at high temperatures, especially when incorporated in oil or fuel compositions, are disclosed in British Patent Specification No. 1,194,286. However, the British patent is unconcerned with waterflooding and neither discloses nor suggests the novel hydrocarbyl substituted succinimido aryl di- and tri-sulfonates, or the corresponding succinamic acid derivatives which form a preferred embodiment of the present invention.

SUMMARY OF THE INVENTION

In accordance with the present invention, there is provided a new and improved oil recovery process wherein an aqueous solution of an anionic surfactant comprising a hydrocarbyl substituted succinimido aryl sulfonate and/or its corresponding succinamic acid derivative is injected into an oil-containing subterranean formation to improve the efficiency of the waterflood. The invention is practiced in a subterranean reservoir which is penetrated by spaced injection and production systems defining a recovery zone of the reservoir. In carrying out the invention, an aqueous driving agent containing the surfactant is injected into the reservoir through the injection system. The surfactants employed in accordance with the invention are particularly suitable for use in reservoirs in which the connate waters exhibit a high divalent metal ion concentration or in waterfloods in which the available injection waters exhibit a relatively high divalent ion concentration. The surfactants used in accordance with the invention show relatively low adsorptive losses and advantageously function as cosurfactants, drastically improving the brine stability of other, more sensitive surfactants such as hydrocarbon sulfonates, e.g., petroleum sulfonates.

Generally speaking, the succinimido aryl sulfonates useful in the practice of the invention are the condensation products of a hydrocarbyl substituted succinic anhydride and an amino aryl mono- or polysulfonic acid. Such sulfonates may be prepared, for example, by reacting one molar equivalent of an alkyl or alkenyl succinic anhydride with one molar equivalent of an amino aryl sulfonic acid in the form of its metal or ammonium or substituted ammonium salt at temperatures of the order of 140–180° C. The reaction is permitted to proceed at that temperature until one molar equivalent of water is evolved from the reaction mixture, which signifies that the reaction is complete. The corresponding succinamic acid derivative may be prepared by the same procedure except that the reaction temperature is maintained in the range of from about 90° C. to about 120° C., and the reaction is permitted to continue until the reaction mixture is completely solubilized in water. The reaction may be followed spectroscopically by periodically taking samples of the reaction mixture and examining their infrared spectra. This procedure is continued until the peak characteristic of the anhydride (5.4 mμ) has essentially disappeared. Alternatively, the succinamic acid sulfonates may be produced by transforming the succinimido aryl sulfonates into their corresponding carboxy amide sulfonates by reacting them with water at temperatures of the order of 60–95° C. at a pH slightly on the alkaline side, e.g., pH of from 8 to 10. Under these conditions, the hydrolytic transformations of the amido sulfonates into the corresponding carboxy amide sulfonates display half lives of the order of 10 minutes to 100 hours, depending upon temperature, pH, concentration and the chemical architecture of the particular imido sulfonate.

The hydrocarbyl succinic anhydrides used in the preparation of the succinimido aryl sulfonates useful in the practice of the invention will preferably conform to the formula

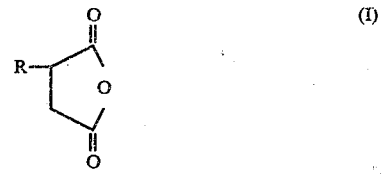

where R is an alkyl or alkenyl radical, linear or branched, including up to about 50 carbon atoms such as, for example, methyl, ethyl, propyl, butyl, pentyl, hexyl, heptyl, methylhexyl, dimethylpentyl, trimethylbutyl, decyl, cyclohexyl, cyclooctyl, dodecyl, tetradecyl, docosyl, tetracosyl, pentacosyl, tricontyl, tetracontyl and pentacontyl, etc., radicals; and alkenyl radicals such as, for example, ethenyl, propenyl butenyl, polybutenyl, pentenyl, dodecenyl, trimethylbutenyl, etc. radicals.

The amino aryl mono- or polysulfonic acids useful in the preparation of the succinimido aryl sulfonates useful in the practice of the invention will preferably conform to the formula

wherein A is aryl, such as a benzene or naphthalene ring; R' is an alkyl or alkenyl group, either linear or branched, and is preferably selected from the same group of radicals as R above; n is from 0 to 3 when A is a benzene ring and is from 0 to 4 when A is a naphthalene ring; m is 1 or 2 when A is a benzene ring and is from 1 to 3 when A is a naphthalene ring. Specific examples of amino aryl sulfonic acids falling within the scope of the above formula are aminobenzene disulfonic acid; aminotoluene disulfonic acid; aminoxylene disulfonic acid; 1-amino,2-dodecyl benzene 3,5-disulfonic acid; 4-ethylanilino 2,5-disulfonic acid; 2 amino, naphthalene 1,5 disulfonic acid; 2 aminonaphthalene 3, 6 disulfonic acid; 1 aminonapthalene 2,4,6 trisulfonic acid; 1,4 dimethyl-2-naphthyl amino 3,6 -disulfonic acid; and 4 dodecyl2-naphthylamino 3,6 disulfonic acid.

In accordance with the invention, the surfactant is employed in the flooding water in an amount sufficient to reduce the oil-water interfacial tension to a value significantly less than 0.1 dyne per centimeter. Preferably, the oil-water interfacial tension is reduced to a value of 0.005 dyne per centimeter or less, in order to reach an optimum microscopic displacement efficiency. In some cases, a total concentration of as small as 0.05 percent by weight of the surfactant will be satisfactory. Generally speaking, a total concentration ranging from about 0.1 percent to about 5 percent by weight, and preferably from about 1 percent to about 3 percent by weight, is employed.

In carrying out the invention, a preferred form of the anionic surfactant comprises a composition selected from the class consisting of hydrocarbyl substituted succinimido aryl sulfonates having the formula

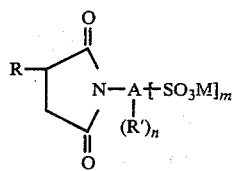

(III)

and their corresponding succinamic acid derivatives having the formula

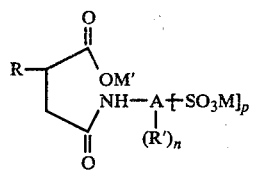

(IV)

where A is aryl such as a benzene or a naphthalene ring, for example. R and R' are the same or different and preferably are selected from the group consisting of alkyl radicals, such as, for example, methyl, ethyl, propyl, butyl, pentyl, hexyl, heptyl, methylhexyl, dimethylpentyl, trimethylbutyl, decyl, cyclohexyl, cyclooctyl, dodecyl, tetradecyl, docosyl, tetracosyl, pentacosyl, tricontyl, tetracontyl and pentacontyl, etc., radicals; and alkenyl radicals such as, for example, ethenyl, propenyl, butenyl, polybutenyl, pentenyl, dodecenyl, trimethylbutenyl, etc. radicals. The total number of carbon atoms in R and R' (i.e., the sum of carbon atoms in R and R') ranges from 10 to 50, and preferably from 14 to 25. Where A is a benzene ring in the above formula, $n$ is from 1 to 3 and $m$ and $p$ are 1 or 2. When A is a naphthalene ring, $n$ is from 0 to 4 and $m$ and $p$ are from 1 to 3.

In the above formula M is selected from the class consisting of alkali and alkaline earth metals such as for example, lithium, potassium, sodium, calcium, magnesium, strontium; or ammonium ($NH_4^+$) or substituted ammonium such as, for example, mono-, di- or tri-substituted alkyl or alkanol ammonium. Preferably, M is a substituted ammonium ion having the formula

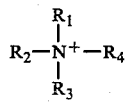

(V)

where $R_1$, $R_2$, $R_3$ and $R_4$ are the same or different and are selected from the class consisting of hydrogen, $R_4$ and at least one carbon atom connected through $R_4$ such that

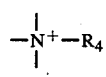

(VI)

forms a heterocyclic ring, and $R_4$ is selected from the class consisting of alkyl and hydroxyalkyl groups containing a total of up to ten carbon atoms.

Examples of substituted ammonium compounds falling within the scope of the above formula are methyl ammonium, ethyl ammonium, isopropyl ammonium, triethyl ammonium, monoethanol ammonium, diethanol ammonium, triethanol ammonium, as well as nitrogen containing ions such as those derived from heterocyclic nitrogen compounds such as, for example, pyridine, morpholine, piperazine, hexamethylenetetramine, pyrimidine, and imidazole.

In accordance with one form of the invention, there are provided novel anionic surfactant compositions comprising compounds from the class consisting of hydrocarbyl substituted aryl succinimido sulfonates having the formula

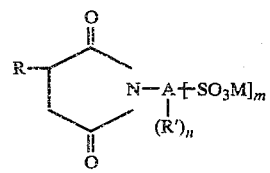

(VII)

and their corresponding succinamic acid derivatives having the formula

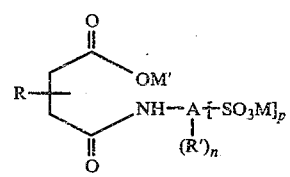

(VIII)

where A, R, R', M and M' having the meanings given above, $n$ is from 0 to 3 and $m$ and $p$ are 2 when A is a benzene ring; and $n$ is from 0 to 4, and $m$ and $p$ are from 1 to 3 when A is a naphthalene ring.

In a further embodiment of the invention, the hydrocarbyl substituted succinimido aryl sulfonates and/or their corresponding succinamic acid derivatives are employed with a hydrocarbon sulfonate surfactant, such as a petroleum sulfonate, which normally precipitates in the presence of even moderate concentrations of divalent metal ions, such as calcium and magnesium. Accordingly, there is provided in accordance with one form of the invention a method of increasing the stability of an anionic sulfonate surfactant in the presence of sodium, calcium or magnesium ions which comprises admixing said surfactant with a hydrocarbyl substituted succinimido aryl sulfonate and/or its corresponding succinamic acid derivative. In general, the hydrocarbyl substituted succinimido aryl sulfonates and their corresponding succinamic acid derivatives falling within the scope of formulas II, III, VI and VII above are preferred in this regard. In this connection, it has unexpectedly been discovered that the polysulfonates, and particularly the disulfonates, are most effective in their ability to stabilize other hydrocarbon sulfonates, such as petroleum sulfonates for example. It has also been discovered that the stabilization effectiveness is optimized where the hydrocarbyl group contains about 14 carbon atoms. Further, it has been found that the stabilization effectiveness is enhanced where the cation (M) associated with the succinimido sulfonate or its succinamic acid derivative is in the form of substituted ammonium, e.g., triethyl ammonium, rather than the alkali or alkaline earth metal.

The hydrocarbon sulfonate whose stability in the presence of divalent metal ions may be increased in accordance with the invention can be any of those widely available commercially under trade names such as "Bryton Chemical F467", "Witco Chemical TRS-10", "American Cyanamid Aerosol OT" and many others. They are usually, and preferably, metal salts of alkylaryl sulfonates, preferably alkaline earth metal salts of alkylbenzene sulfonates, containing 12–30 carbon atoms, but can also be sulfocarboxylate salts, aliphatic sulfonates, alkylated naphthalene sulfonates and the like, the essential requirement being that it have surfactant properties. The cationic portion can be an alkaline or alkaline earth metal, ammonium, or substituted ammonium such as, for example, M in the above formula. Generally, the cationic portion is usually sodium. The molecular weight of this hydrocarbon sulfonate surfactant is usually in the range of 300–600, more frequently 350–525. These materials can be prepared by well-known procedures such as those described in U.S. Pat. No. 3,308,068. They can be prepared synthetically or can be those prepared from petroleum and commonly known as petroleum sulfonates.

In general, the amount of the hydrocarbyl substituted succinimido aryl sulfonate and/or its corresponding succinamic acid derivative that is admixed with another anionic hydrocarbon sulfonate to increase its stability in the presence of divalent metal ions may vary within wide limits, depending upon the concentration of divalent metal ions to which the mixture is to be exposed. Generally speaking, the weight ratio of the hydrocarbon substituted succinimido aryl sulfonate (and/or its succinamic acid derivative) to the hydrocarbon sulfonate will range from 0.1 to 5, and preferably from 0.1 to 3. Aqueous solutions of such mixtures may be used in waterfloods in which the subterranean formation contains a divalent ion concentration of from 500 to 20,000 parts per million. Alternatively, such mixtures may be admixed with available injection waters exhibiting a divalent ion concentration of from 500 to 20,000 parts per million. It has been discovered that where the anionic hydrocarbyl substituted succinimido aryl sulfonate (and/or its corresponding succinamic acid derivative) is to be used alone, the R group in formulas III, IV, VII and VIII should preferably contain from about 16 to about 50 carbon atoms. Where, on the other hand, such succinimide surfactants are to be admixed with other hydrocarbon sulfonates to improve their brine tolerance, R in formulas III, IV, VII and VIII may advantageously contain from 12 to 20 carbon atoms, and preferably contains 14 carbon atoms.

In order that those skilled in the art may better understand how the novel surfactants of the present invention may be prepared, the following examples are given by way of illustration and not by way of limitation. All parts and percentages are by weight unless otherwise noted.

EXAMPLE 1

A mixture of sixty parts by weight of n-tetradecenyl succinic anhydride and ninety-two parts of the triethylamine salt of aminobenzenedisulfonic acid was stirred for approximately two to three hours at 170° C. until the evolution of water ceased. Approximately 148 parts of a crude product was recovered which was further purified by recrystallization from an appropriate solvent, such as isopropanol or acetone. After recrystallization, the material had the appearance of white crystals characterized by a melting point of 190° C. (dec.) and had the following structure:

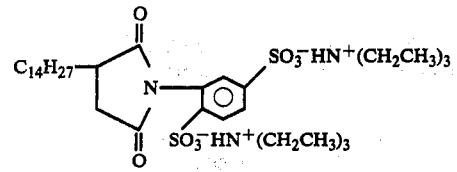

EXAMPLE 2

By the method of Example 1 eighty-four parts of polybutenyl succinic anhydride in which the polybutenyl side chain had a molecular weight of about 640 were reacted with 46 parts of the triethylamine salt of aminobenzenedisulfonic acid. There were obtained 125 grams of a product having the structure

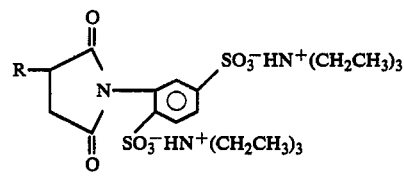

where R has an average molecular weight of 640 (i.e., included 46 carbon atoms).

EXAMPLE 3

By the method of Example 1 fifty parts of polybutenyl succinic anhydride in which the polybutenyl had an average molecular weight of 340 were reacted with 46 parts of the triethylamine salt of aminobenzenedisulfonic acid. There were obtained 90 parts by weight of product having the structure

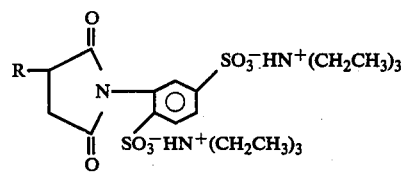

where R has an average molecular weight of 340.

EXAMPLE 4

By the method of Example 1 13.3 parts of dodecenyl succinic anhydride were reacted with 22.7 parts of the triethylamine salt of aminobenzenedisulfonic acid. There were obtained 35 parts by weight of product having the structure

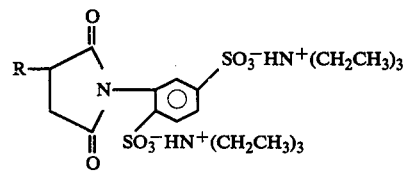

where R was $C_{12}H_{23}$.

EXAMPLE 5

Thirty parts of polybutenyl succinic anhydride (R=MW 340) were reacted with 17.5 parts of the disodium salt of 2-amino-3,6 naphthalene disulfonic acid by the method of Example 1. There were obtained 45 parts by weight of product having the structure

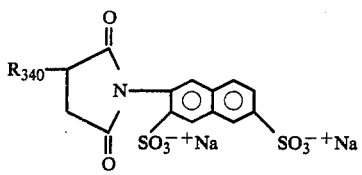

EXAMPLE 6

By the method of Example 1 sixty parts of n-tetradecenyl succinic anhydride were reacted with 70 parts of the calcium salt of aminobenzenedisulfonic acid at 170° C. for about six hours. There were obtained about 125 parts of a product having the structure

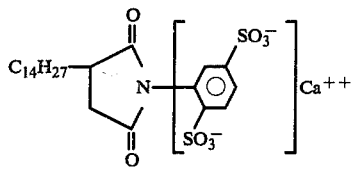

EXAMPLE 7

A mixture of 60 parts by weight of n-tetradecenyl succinic anhydride and 92 parts by weight of the triethylamine salt of aminobenzenedisulfonic acid was stirred for approximately five to eight hours at 90° C. The reaction was followed spectroscopically by periodically recording its infrared spectrum, and was continued until the peak characteristic of the anhydride (5.4mμ) has essentially disappeared. About 150 parts of product were obtained having as the major component the structure

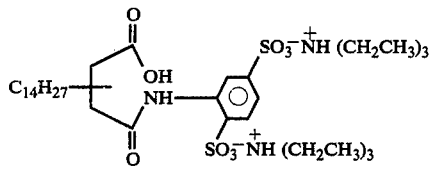

EXAMPLE 8

Three parts of the product of Example 1 were dissolved in 200 parts of water whose pH was adjusted to 9 at room temperature. After 67 hours, one half of the dissolved product of Example 1 was converted to its corresponding succinamic acid derivative having the structure

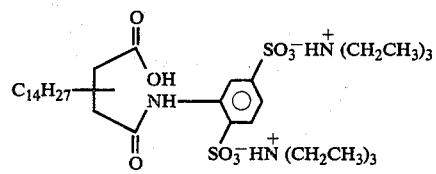

after 96 hours, 63% of the dissolved product of Example 1 was converted to its corresponding succinamic acid derivative.

EXAMPLE 9

Fifteen parts of the product of Example 1 were dissolved in 85 parts of water whose pH was 8.5 and the solution was heated to and maintained at 95° C. After one hour, 50% of the dissolved product of Example 1 was converted to its corresponding succinamic acid derivative having the structure as set forth in Example 8. After two hours at 95° C., 75% of the dissolved product was converted to its corresponding succinamic acid derivative.

Laboratory displacement experiments were conducted to demonstrate the efficacy of the hydrocarbyl substituted succinimido aryl sulfonates (and their corresponding succinamic acid derivatives) of the present invention when employed as co-surfactants in combination with a hydrocarbon sulfonate and when employed alone. The laboratory tests involved linear displacement tests performed in three foot long glass tubes having an inside diameter of 11/32 inch. In each tube run, the glass tube was packed with unconsolidated Berea sand and then saturated with water having a total salinity ranging from about 3 weight percent to 10 weight percent and containing from about 3,000 to about 12,000 parts per million divalent cations ($Ca^{++}$ and $Mg^{++}$). The tube was then flooded with West Ranch crude oil (41A reservoir) until the effluent from the tube contained no water in order to achieve a state of initial oil saturation.

In one displacement test, the tube as thus prepared was then subjected to a simulated conventional waterflood by the injection of brine having the same salinity as the brine used to water-saturate the column. The injection of the brine was continued until no further oil was displaced. This water-flood resulted in the recovery of a portion of the oil, leaving an amount unrecoverable by conventional waterflooding (i.e., "tertiary oil"). Thereafter, a solution containing from 0.4 to 2.5 weight percent of an anionic surfactant whose volume was between 0.1 and 0.7 of the pore volume of the sand-packed column was injected into the tube. This was followed by the injection of brine until no further oil was recovered. This procedure resulted in the recovery of a proportion of the oil otherwise unrecoverable. The data from the various displacement tests are reported in Table I below. All tests were conducted at room temperature unless otherwise indicated.

TABLE I

| Run # | Surfactant | & Concentration | Brine (Wt%) | Divalent Ions(ppm) | Surfactant Solution (pore vol.) | Residual Oil (ml) | Residual Oil Recovered (ml) | Tertiary Recovery (%) |
|---|---|---|---|---|---|---|---|---|
| 1 | A | 0.45% | 6% | 7,000 | 0.65 | 5.17 | 1.10 | 21.3 |
| 2 | B | 0.9% | 10% | 17,000 | 0.60 | 5.30 | 1.83 | 34.5 |
| 3 | C | | 6% | 7,000 | 0.60 | 4.70 | 3.80 | 80.9 |
| 4 | C | (at 130° F.) | 6% | 7,000 | 0.62 | 5.98 | 4.80 | 80.3 |
| 5 | D | (at 130° F.) | 6% | 7,000 | 0.6 | 5.05 | 4.98 | 98.6 |

Surfactant A in Run 1 was the hydrocarbyl substituted succinimido naphthyl disulfonate whose preparation is described in Example 5.

Surfactant B in Run 2 had the structure

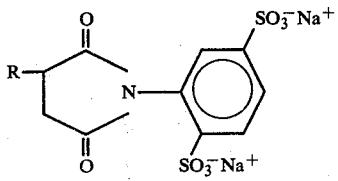

where R was a polybutenyl radical having an average molecular weight of 340.

Surfactant C in Runs 3 and 4 was a mixture of 1% of petroleum sulfonate (Witco TRS-1080) and 0.5% of the product of Example 1. Run 4, as noted, was conducted at 130° F.

Surfactant D in Run 5 was a mixture of 1.67% of petroleum sulfonate (Witco TRS-1080) and 0.83% of the product of Example 7. The aqueous solution of the surfactant in this run also included a mobility control agent (1,000 ppm Kelzan polysaccharide in 1% NaCl).

In another set of experiments, the adsorption of the succinimido-sulfonates in two different adsorbents was measured. The results showed that with Berea sand as the substrate, these surfactants adsorbed 2 to 10 times less than petroleum sulfonate (Witco TRS-1080), depending on surfactant concentration and the chemical nature of the succinimido-sulfonate.

The experimental conditions used to determine adsorption were as follows: a solution of surfactant (10ml) was shaken for 16 hours at room temperature in the presence of 2gm. of either Berea sand or calcium carbonate. After centrifugation, the surfactant concentration was determined spectrophotometrically. In the case of surfactant E, which had the structure

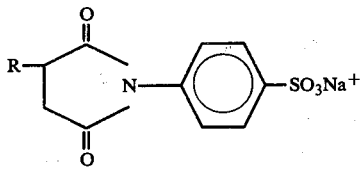

where R was polybutene having an average molecular weight of 340, the adsorbance at 253 m$\mu$ (peak due to the succinimide moiety) was measured. In the case of Surfactant B, as defined above, the adsorbance at 255 m$\mu$ (shoulder) was measured. The succinimide peak of Surfactant B was shifted to 246 m$\mu$ and occurred as a shoulder; this was the wavelength of adsorbance measurements. The adsorbance included Berea sand having a surface area of 3.5 m$^2$/gm and calcium carbonate having a surface area of 13 m$^2$/gm. Tables II through V summarize the data obtained on the adsorption loss experiments. Surfactant G was the product of Example 3. Thirty percent of the mixed brine contains 19.3% NaCl, 10.2% CaCl$_2$.2H$_2$9, and 6.4% MgCl$_2$.6H$_2$O.

TABLE II

| Initial Concentration (ppm) of Surfactant Solution with Water | Final Concentration (ppm) | Adsorption mg/m$^2$ |
| --- | --- | --- |
| TRS-1080 (Berea sand, distilled water, petroleum sulfonate) | | |
| 10,641 | 5,238 | 7.4 |
| 5,306 | 2,587 | 3.8 |
| 3,621 | 1,678 | 2.8 |
| 2,362 | 1,357 | 1.4 |
| 1,400 | 695 | 1.0 |
| Surfactant E (Berea sand, 10% mixed brine) | | |
| 10,683 | 9,997 | 0.96 |
| 5,116 | 4,229 | 1.23 |
| 3,274 | 2,778 | 0.72 |
| 2,002 | 1,535 | 0.64 |
| 1,065 | 661 | 0.51 |
| Surfactant F (Berea sand, 10% mixed brine) | | |
| 10,050 | 9,400 | 0.89 |
| 5,080 | 4,680 | 0.48 |
| 3,520 | 3,200 | 0.42 |
| 2,030 | 1,930 | 0.13 |
| 994 | 927 | 0.09 |
| Surfactant E (Calcium carbonate, 10% mixed brine) | | |
| 10,500 | 10,625 | 0 |
| 5,620 | 5,380 | 0.09 |
| 3,590 | 3,280 | 0.11 |
| 2,570 | 2,250 | 0.12 |
| 1,540 | 1,020 | 0.20 |

TABLE III

Adsorption of Surfactant G

| Initial Concentration (ppm) of Surfactant Solution with Water | Final Concentration (ppm) | Adsorption mg/m$^2$ |
| --- | --- | --- |
| 4.5% mixed brine; Berea sand | | |
| 9,900 | 9,650 | 0.36 |
| 4,663 | 4,488 | 0.25 |
| 3,088 | 3,000 | 0.13 |
| 1,840 | 1,705 | 0.19 |
| 750 | 665 | 0.12 |
| 10% mixed brine; Berea sand | | |
| 9,700 | 9,000 | 1.00 |
| 4,500 | 4,200 | 0.43 |
| 7,780 | 2,620 | 0.23 |
| 1,870 | 1,730 | 0.20 |
| 950 | 855 | 0.13 |
| 4.5% mixed brine; Calcium Carbonate | | |
| 10,020 | 9,890 | 0.03 |
| 3,995 | 3,505 | 0.09 |
| 3,015 | 2,620 | 0.08 |
| 1,848 | 1,638 | 0.04 |
| 1,172 | 576 | 0.15 |

TABLE IV

Adsorption of TRS-1080 Petroleum Sulfonate

| Initial Concentration (ppm) of Surfactant Solution with Water | Final Concentration (ppm) | Adsorption mg/m$^2$ |
| --- | --- | --- |
| 1.5% NaCl, Berea sand | | |
| 12,520 | 8,530 | 2.85 |
| 5,030 | 1,610 | 2.44 |
| 2,880 | 690 | 1.56 |
| 1,910 | 520 | 0.99 |
| 1,105 | 290 | 0.58 |
| 1.5% NaCl, Berea sand (treated with 0.1% sodium carbonate, 0.1% STP) | | |
| 16,100 | 13,900 | 1.57 |
| 10,100 | 8,200 | 1.36 |
| 3,920 | 3,080 | 0.60 |
| 2,310 | 1,430 | 0.62 |
| 1,090 | 590 | 0.36 |
| 1.5% NaCl, Berea sand (2:1 TRS-1080/Surfactant G) | | |
| 10,360 | 10,300 | 0.05 |
| 5,200 | 5,260 | 0 |
| 3,310 | 2,930 | 0.27 |
| 2,240 | 1,940 | 0.21 |
| 1,050 | 850 | 0.14 |
| 4.5% mixed brine, Berea sand (2:1 mixture with Surfactant G) | | |
| 10,550 | 9,100 | 2.1 |
| 5,165 | 4,230 | 1.3 |
| 3,210 | 2,270 | 1.3 |
| 2,178 | 1,450 | 1.0 |
| 997 | 451 | 0.8 |
| 4.5% mixed.brine, Calcium Carbonate (2:1 mixture with Surfactant G) | | |
| 10,400 | 9,550 | 0.17 |

TABLE IV-continued

Adsorption of TRS-1080 Petroleum Sulfonate

| Initial Concentration (ppm) of Surfactant Solution with Water | Final Concentration (ppm) | Adsorption mg/m² |
|---|---|---|
| 4,790 | 4,375 | 0.11 |
| 5,310 | 2,670 | 0.13 |
| 1,970 | 1,220 | 0.14 |
| 983 | 370 | 0.12 |

TABLE V

Total Surfactant Adsorption

| Initial Concentration (ppm) of Surfactant Solution with Water | Final Concentration (ppm) | Adsorption mg/m² |
|---|---|---|
| 2:1 TRS-1080/Surfactant G; Berea sand; 1.5% NaCl | | |
| 15,600 | 15,540 | 0.05 |
| 7,470 | 7,530 | 0 |
| 5,000 | 4,620 | 0.27 |
| 3,380 | 3,080 | 0.21 |
| 1,590 | 1,390 | 0.14 |
| 2:1 TRS-1080/Surfactant G; Berea sand; 4.5% mixed brine | | |
| 15,920 | 14,285 | 2.4 |
| 7,785 | 6,745 | 1.5 |
| 4,847 | 3,782 | 1.5 |
| 3,278 | 2,450 | 1.1 |
| 1,501 | 880 | 0.9 |
| 2:1 TRS-1080/Surfactant G; Calcium Carbonate; 4.5% mixed brine | | |
| 15,675 | 14,755 | 0.18 |
| 7,450 | 6,650 | 0.16 |
| 4,980 | 4,110 | 0.17 |
| 2,970 | 2,115 | 0.17 |
| 1,485 | 475 | 0.19 |

The present invention is carried out in a recovery zone of a subterranean oil-bearing reservoir. As will be understood by those skilled in the art, the term "recovery zone", as used herein and in the appended claims is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" may be utilized in which case the injection and production systems comprise rows of wells spaced from one another. In this type of pattern, the recovery zone, as defined by the spaced rows of injection and production wells, generally will be that portion of the reservoir underlying the area between the spaced rows. Exemplary of other patterns which may be used are the so-called "circular flood" patterns in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subjected to the displacing action of the injected flooding medium. The above and other patterns are well known to those skilled in the art, and for a more detailed description of such patterns reference is made to Uren, L. C., "Petroleum Production Engineering — Oil Field Exploitation," Second Edition, McGraw-Hill Book Company, New York and London, 1939, and, more particularly to the section entitled "The Waterflooding Process", appearing at pages 444–459.

It will also be recongnized that the invention may be carried out utilizing one or more dually completed injection production wells of the type, for example, disclosed in U.S. Pat. No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearo and the production system would comprise the upper completion interval of one or more of such wells. In this case, of course, the recovery zone would be that portion of the reservoir subject to the displacing action of the flooding medium as it moves upwardly through the reservoir. For further descriptions of other well arrangements which may be employed in waterflooding, reference is made to Calhoun, J. C., Jr., FUNDAMENTALS OF RESERVOIR ENGINEERING, University of Oklahoma Press, Norman, 1960, pp. 371–376.

The present invention may be and preferably is conducted in conjunction with the use of a thickening agent added for mobility control purposes. The thickening agent may be added to the aqueous surfactant slug containing the hydrocarbyl substituted succinimido aryl sulfonates (and/or their corresponding succinamic acid derivatives), or it may be injected immediately after the slug containing the anionic surfactant of the invention. The thickening agent may be added in concentrations so as to provide graded viscosity at the trailing edge of the mobility control slug or graded viscosities at both the leading and trailing edges of the mobility control slug. Alternatively, the thickening agent concentration may be relatively constant throughout. Normally, the viscosity of at least a portion of the mobility control slug should be at least as great as that of the reservoir, and typically it will be within the range of from about 1 to about 4 times the viscosity of the reservoir oil. Various thickening agents which may be employed for mobility control purposes are well known to those skilled in the art, and include such polymers as polysaccharide B-1459 available from the Kelco Company under the trade designation "Kelzan" and the various partially hydrolyzed polyacrylamides available from the Dow Chemical Company under the trade designation "Pusher Chemicals."

In view of the compatibility of the hydrocarbyl substituted succinimido aryl sulfonates and their corresponding succinamic acid derivatives with divalent metal ions, a preferred application of the invention is in reservoirs in which the connate water contains a significant divalent ion concentration, and in situations where the available flooding medium contains divalent metal ions inconsistant with the conventional use of hydrocarbon sulfonate surfactants. Thus, the invention finds particular utility in situations in which the reservoir waters and/or the waters employed in formulating the flooding medium exhibit a divalent metal ion concentration within the range of from 500 to 20,000 parts per million.

The hydrocarbyl substituted succinimido aryl sulfonates and/or their corresponding succinamic acid derivative may be employed in accordance with the present invention in any suitable concentration depending upon the characteristics of the particular reservoir employed and such factors as surfactant consumption, e.g., by adsorption, and dispersion of the surfactant into the reservoir waters. As noted above, in some cases a total concentration of as small as 0.05 percent by weight of the surfactant will be satisfactory. However, a total concentration ranging from about 0.1% to about 5% by weight, and preferably from about 1% to about 3% by weight, is normally employed. Where the hydrocarbyl substituted succinimido aryl sulfonate and/or its corresponding succinamic acid derivative is employed as a co-surfactant in combination with a hydrocarbon sulfonate, the hydrocarbon sulfonate will be employed in a concentration sufficient to provide the desired surfactant-co-surfactant ratio as described previously.

While the aqueous solution of the anionic hydrocarbyl substituted succinimido aryl sulfonate and/or its succinamic acid derivative, either alone or as a co-surfactant in combination with a hydrocarbon sulfonate, may be employed as the sole displacing fluid, it will usually be injected as a discrete slug and then followed by a driving fluid. Preferably, the aqueous surfactant solution is injected in an amount of at least 0.05 pore volume. Typically, the size of the surfactant slug will be within the range of from 0.05 to 0.6 pore volume. The term "pore volume" as used herein to define the quantities of fluids injected in carrying out the invention, designates the pore volume of the formation underlying the well pattern defined by the wells comprising the injection and production systems. Where a relatively viscous mobility control fluid is employed, it normally will be injected in an amount within a range of from about 0.05 to 0.2 pore volume. Thereafter a driving fluid is injected in order to displace the previously injected fluids through the formation. The driving fluid typically may be any water which is locally available and is not compatible with the formation. The driving fluid is injected in such amount as is necessary to carry the recovery process to its conclusion.

The present invention may be carried out utilizing injection and production systems as defined by any suitable arrangement of wells, and does not require special equipment over that ordinarily employed in carrying out a waterflood. One well arrangement commonly used in waterflooding operations and suitable for use in carrying out the present invention is an integrated five-spot pattern of the type illustrated in U.S. Pat No. 3,927,716 — Burdyn et al. Other well arrangements useful in carrying out the present invention will readily occur to those skilled in the art.

It should be understood that while the present invention has been described in considerable detail with respect to certain specific embodiments thereof, it should not be considered limited to such embodiments but may be used in other ways without departure from the spirit of the invention and the scope of the appended claims.

What is claimed is:

1. In the recovery of oil from a subterranean oil reservoir penetrated by spaced injection and production systems defining a recovery zone of said reservoir, the method comprising:

introducing into said reservoir, via said injection system, an aqueous solution, containing from about 0.1% to about 5% by weight of an anionic surfactant comprising a hydrocarbyl substituted succinimido aryl sulfonate having the formula

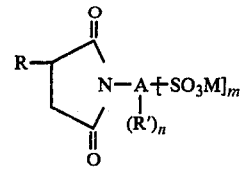

where A is a benzene or naphthalene ring;

R and R' are the same or different and are selected from the class consisting of alkyl and alkenyl radicals, the total number of carbon atoms in R and R' being from 10 to 50;

$n$ is from 0 to 3 and $m$ is 1 or 2 when A is a benzene ring;

$n$ is from 0 to 4 and $m$ is from 1 to 3 when A is a naphthalene ring; and

M is selected from the class consisting of alkali and alkaline earth metals, ammonium or substituted ammonium; and recovering oil from said production system.

2. The method of claim 1 in which $m$ is 2.

3. The method of claim 1 in which R contains 14 carbon atoms and $n$ is 0.

4. The method of claim 1 in which said surfactant also includes a petroleum sulfonate, the weight ration of said hydrocarbyl substituted succinimido aryl sulfonate to said petroleum sulfonate ranging from 0.1 to 5.

5. The method of claim 1 in which said surfactant comprises about five parts by weight of a petroleum sulfonate and about one part by weight of said hydrocarbyl substituted succinimido aryl sulfonate.

6. The method of claim 1 in which M is an alkali metal.

7. The method of claim 1 in which M is trialkylammonium.

8. The method of claim 1 in which said subterranean oil reservoir contains water having a divalent ion concentration of from 500 to 20,000 parts per million.

9. The method of claim 1 in which said aqueous solution has a divalent ion concentration of from 500 to 20,000 parts per million.

10. The method of claim 1 in which M is substituted ammonium having the formula

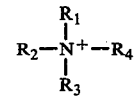

where $R_1$, $R_2$, and $R_3$ are the same or different and are selected from the class consisting of hydrogen, $R_4$ and at least one carbon atom connected through $R_4$ such that

forms a heterocyclic ring, and $R_4$ is selected from the class consisting of alkyl and hydroxy alkyl groups containing a total of up to 10 carbon atoms.

11. The method of claim 1 in which said hydrocarbyl substituted succinimido aryl sulfonate includes at least two sulfonate groups.

12. The method of claim 1 in which said hydrocarbyl group contains from 14 to 25 carbon atoms.

13. The method of claim 1 in which said anionic surfactant comprises a mixture of said hydrocarbyl substituted succinimido aryl sulfonate and its corresponding succinamic acid derivative having the formula

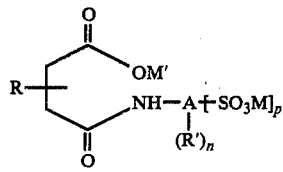

wherein A, R, R', n, and M are as defined in claim 1;
p is 1 or 2 when A is a benzene ring;
p is from 1 to 3 when A is a naphthalene ring; and M' is hydrogen or M.

14. The method of increasing the stability of an anionic hydrocarbon sulfonate surfactant in the presence of sodium, calcium or magnesium ions which comprises admixing said surfactant with a hydrocarbyl substituted succinimido aryl sulfonate having the formula

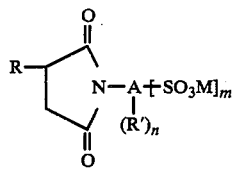

where A is a benzene or naphthalene ring:
R and R' are the same or different and are selected from the class consisting of alkyl and alkenyl radicals, the total number of carbon atoms in R and R' being from 10 to 50;
$n$ is from 0 to 3 and $m$ is 1 or 2 when A is a benzene ring;
$n$ is from 0 to 4 and $m$ is from 1 to 3 when $a$ is a naphthalene ring; and
M is selected from the class consisting of alkali and alkaline earth metals, ammonium or substituted ammonium;
the weight ratio of said hydrocarbyl substituted succinimido aryl sulfonate to said hydrocarbon sulfonate surfactant ranging from 0.1 to 5, said hydrocarbyl substituted succinimido aryl sulfonate being present in a concentration of from about 0.1% to about 5%.

15. An aqueous solution of an anionic surfactant comprising a hydrocarbyl substituted succinimido aryl sulfonate having the formula

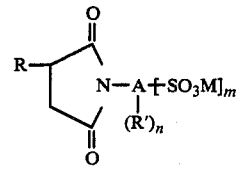

where A is a benzene or naphthalene ring:
R and R' are the same or different and are selected from the class consisting of alkyl and alkenyl radicals, the total number of carbon atoms in R and R' being from 10 to 50;
$n$ is from 0 to 3 and $m$ is 1 or 2 when A is a benzene ring;
$n$ is from 0 to 4 and $m$ is from 1 to 3 when $a$ is a naphthalene ring; and
M is selected from the class consisting of alkali and alkaline earth metals, ammonium or substituted ammonium;
said solution including a divalent metal ion concentration of from about 500 to about 20,000 parts per million, said hydrocarbyl substituted succinimido aryl sulfonate being present in a concentration of from about 0.1% to about 5%.

16. The aqueous solution of claim 15 in which said surfactant also includes a hydrocarbon sulfonate, the weight ratio of said hydrocarbyl substituted succinimido aryl sulfonate to said hydrocarbon sulfonate ranging from 0.1 to 5.

17. The aqueous solution of claim 16 in which said hydrocarbon sulfonate comprises a petroleum sulfonate having an average molecular weight of from about 350 to about 500.

* * * * *